(12) United States Patent
Price et al.

(10) Patent No.: US 7,550,871 B2
(45) Date of Patent: *Jun. 23, 2009

(54) POWER ADAPTER FEATURING MULTIPLE POWER OUTPUTS

(75) Inventors: Erin L. Price, Pflugerville, TX (US); Robert Allen, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/750,666

(22) Filed: May 18, 2007

(65) Prior Publication Data

US 2007/0222296 A1  Sep. 27, 2007

Related U.S. Application Data

(62) Division of application No. 10/966,616, filed on Oct. 15, 2004.

(51) Int. Cl.
*H02J 3/14* (2006.01)
*H02M 1/00* (2007.01)
*G06F 1/26* (2006.01)

(52) U.S. Cl. .......................... 307/38; 307/39; 363/146; 713/330

(58) Field of Classification Search ................. 363/146; 439/33; 713/330; 307/38, 39
See application file for complete search history.

(56) References Cited

U.S. PATENT DOCUMENTS

| 5,721,934 | A | * | 2/1998 | Scheurich | .................. 713/320 |
| 6,301,674 | B1 | | 10/2001 | Saito et al. | |
| 6,396,169 | B1 | | 5/2002 | Voegeli et al. | |
| 6,448,672 | B1 | | 9/2002 | Voegeli et al. | |
| 6,512,682 | B2 | | 1/2003 | Cohen et al. | |
| 6,721,672 | B2 | | 4/2004 | Spitaels et al. | |
| 6,900,820 | B2 | * | 5/2005 | Kataoka et al. | ............. 345/690 |
| 6,921,987 | B2 | * | 7/2005 | Marin-Martinod | ........... 307/32 |
| 7,099,784 | B2 | | 8/2006 | Spitaels et al. | |
| 7,242,111 | B2 | * | 7/2007 | Menas et al. | ................... 307/38 |
| 2005/0102043 | A1 | * | 5/2005 | Menas et al. | .................. 700/22 |
| 2006/0015757 | A1 | * | 1/2006 | Tupman et al. | ............. 713/300 |

OTHER PUBLICATIONS

"Rising Material Costs Bring Higher Prices", Jul. 13, 2004 (http//www.hardwares.globalsources.com).

* cited by examiner

*Primary Examiner*—Albert W Paladini
*Assistant Examiner*—Hal I Kaplan
(74) *Attorney, Agent, or Firm*—Haynes and Boone, LLP

(57) ABSTRACT

In a power adapter having multiple power outputs, a first information handling system (IHS) is coupled to a first power output included by the multiple power outputs. A second IHS is coupled to a second power output included by the multiple power outputs. A controller is coupled to each IHS and each power output. In response to the first IHS being decoupled from the first power output, an amount of power that is supplied to the second power output is determined.

12 Claims, 5 Drawing Sheets

POWER ADAPTER FEATURING MULTIPLE POWER OUTPUTS

CROSS-REFERENCE TO RELATED APPLICATION

This application claims priority to and is a divisional of co-owned co-pending U.S. patent application Ser. No. 10/966,616 filed Oct. 15, 2004, which is incorporated herein by reference in its entirety.

BACKGROUND

The description herein relates generally to information handling systems ("IHSs") and more particularly to power adapters for IHSs.

As the value and use of information continue to increase, individuals and businesses seek additional ways to process and store information. One option available to users is information handling systems. An IHS generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In some situations, multiple portable IHSs (e.g., a notebook computer or a laptop computer) are used in a single physical location (e.g., a conference room). In such situation, each of the multiple portable IHSs likely operates in association with its own power adapter so that the portable IHS may receive power from a power source (e.g., an alternating current ("AC") outlet).

In such situation, the number of IHSs usable at the physical location may be limited by, for example, the number of AC outlets available. Also, operating multiple portable IHSs, each with its own power adapter, may cause various problems including personal injury (e.g., injury caused by tripping over wires) and equipment damage.

Accordingly, what is needed is a power adapter and method without the disadvantages discussed above.

SUMMARY

In a power adapter having multiple power outputs, a first information handling system (IHS) is coupled to a first power output included by the multiple power outputs. A second IHS is coupled to a second power output included by the multiple power outputs. A controller is coupled to each IHS and each power output. In response to the first IHS being decoupled from the first power output, an amount of power that is supplied to the second power output is determined.

DETAILED DESCRIPTION

For purposes of this disclosure, an information handling system ("IHS") includes any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. Example of an IHS include a personal computer ("PC"), a network storage device, personal digital assistant ("PDA"), or any other suitable device with variations in size, shape, performance, functionality, and price. An IHS also includes other components such as, random access memory ("RAM"), one or more processing resources (e.g., central processing unit ("CPU")), hardware or software control logic, read only memory ("ROM"), other types of memory, one or more disk drives, one or more network interfaces, one or more input/output devices and/or one or more buses.

Figure 1:
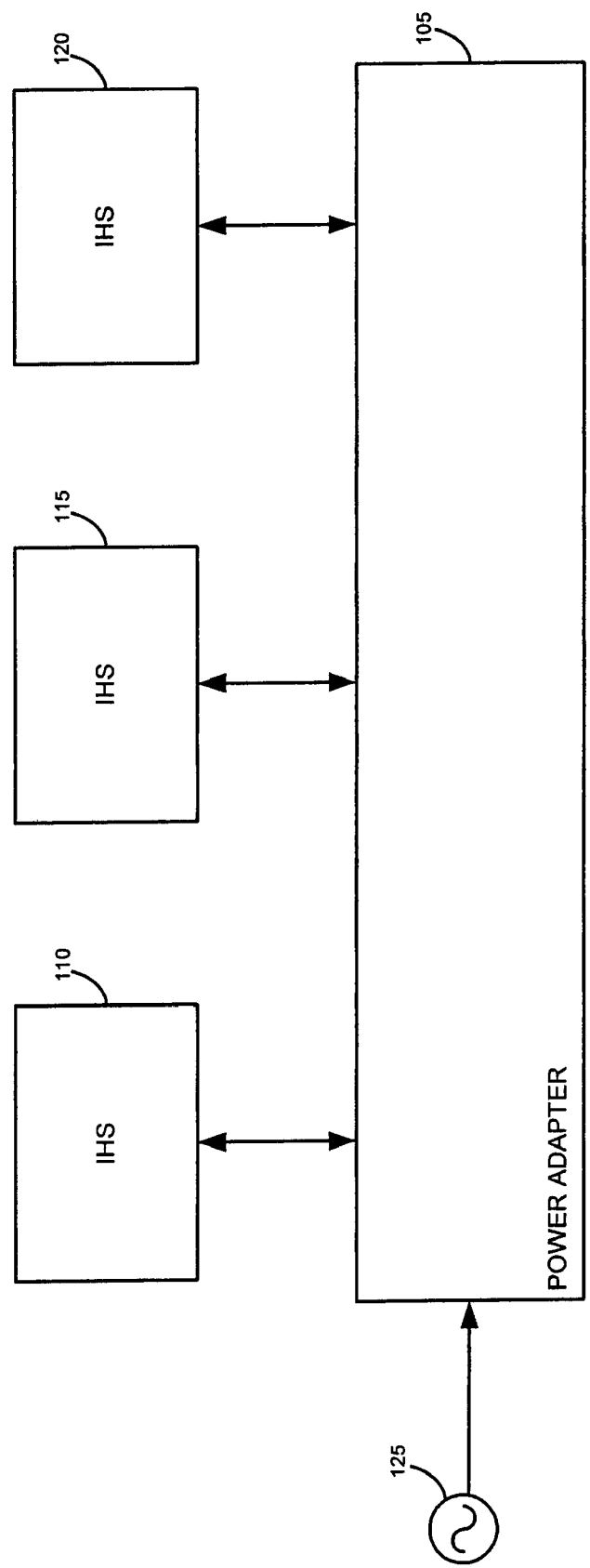
FIG. 1 is a block diagram of a power adapter coupled to multiple IHSs, according to the illustrative embodiment.

FIG. 1 is a block diagram of a power adapter that couples to multiple IHSs, according to the illustrative embodiment. Accordingly, a power adapter 105 is coupled to an IHS 110, an IHS 115, and an IHS 120. The power adapter 105 is coupled to and receives power from a power source 125 (e.g., an alternating current ("AC") outlet, so that the power adapter 105 is able to supply each of the IHSs 110, 115, and 120 with power that is received from the power source 125.

Figure 2:
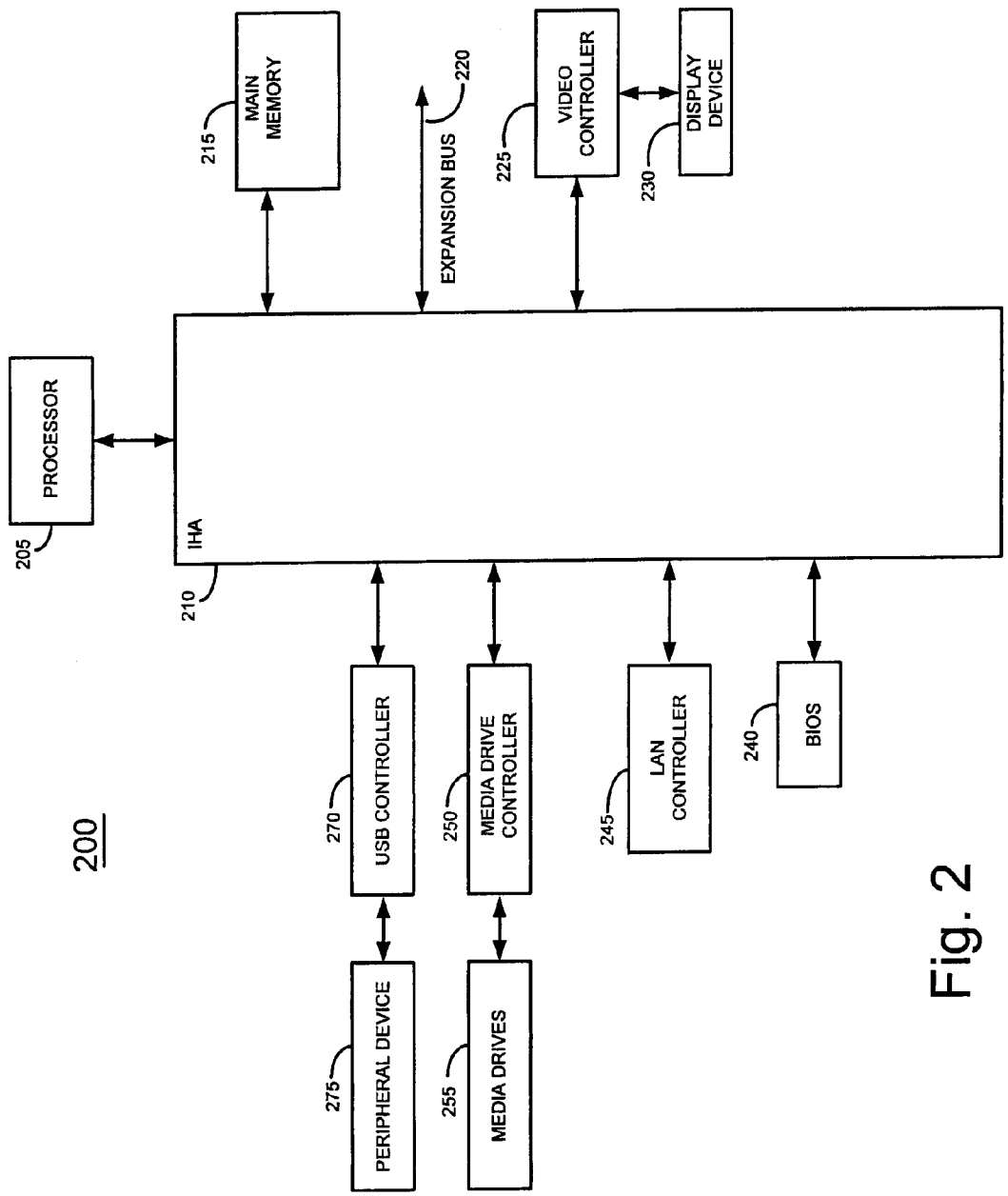
FIG. 2 is a block diagram of an information handling system that is representative of one of the IHSs of FIG. 1, according to the illustrative embodiment.

FIG. 2 is a block diagram of an IHS, indicated generally at 200, that is representative of one of the IHSs 110, 115, and 120, according to the illustrative embodiment. The IHS 200 includes a processor 205 (e.g., an Intel Pentium series processor). An Intel Hub Architecture (IHA) chipset 210 provides the IHS 200 with graphics/memory controller hub functions and I/O functions. More specifically, the IHA chipset 210 acts as a host controller which communicates with a video controller 225 coupled thereto. A display device 230 is coupled to the video controller 225.

The chipset 210 further acts as a controller for main memory 215 which is coupled thereto. The chipset 210 also acts as an input/output ("I/O") controller hub (ICH) which performs I/O functions. A USB controller 270 is coupled to chipset 210 so that devices such as a print device 275 can be connected to the chipset 110 and the processor 205. A system basic input-output system ("BIOS") 240 is coupled to chipset 210 as shown. The BIOS 240 is stored in CMOS or FLASH memory so that it is nonvolatile.

A local area network ("LAN") controller 245, alternatively called a network interface controller ("NIC"), is coupled to the chipset 210 to facilitate connection of the IHS 200 to other IHSs via a network (e.g., the network 125). A media driver controller 250 is coupled to chipset 210 so that devices such as media drives 255 can be connected to the chipset 210 and the processor 205. Examples of the media devices 255 capable of being coupled to the media controller 250 include CD-ROM drives, DVD drives, hard disk drives and other fixed or removable media drives. An expansion bus 220, such as a PCI bus, PCI Express bus, serial advanced technology attachment ("SATA") bus or other bus is coupled to the chipset 110 as shown. The expansion bus 220 includes one or more expansion slots (not shown) for receiving expansion cards which provide the IHS 200 with additional functionality.

Figure 3:
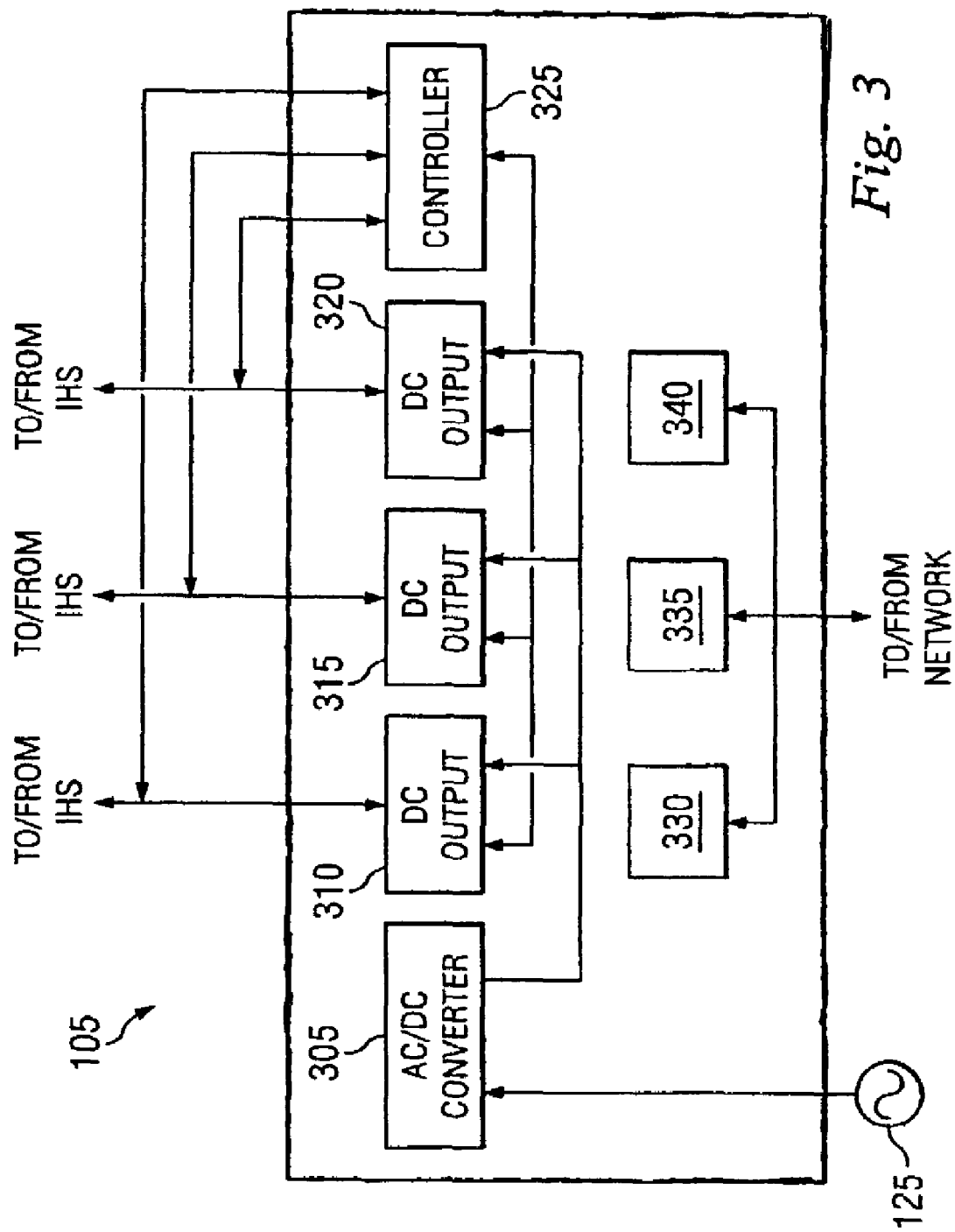
FIG. 3 is a block diagram of the power adapter of FIG. 1, according to the illustrative embodiment.

FIG. 3 is a block diagram of the power adapter 105 of FIG. 1, according to the illustrative embodiment. The power adapter 105 includes an alternating current/direct current ("AC/DC") converter 305. The AC/DC converter 305 is coupled to the power source 125. The power source 125 is an AC power source such as an AC outlet. The power adapter 105 also includes power outputs 310, 315, and 320. Each of the power outputs 310, 315, and 320 is a DC power output. Via the power outputs 310, 315, and 320, the power adapter 105 supplies power to multiple IHSs. Accordingly, each of the power outputs 310, 315, 320 is coupled to an IHS (e.g., one of the IHSs of FIG. 1) as shown in FIG. 3. Moreover, the power adapter 105 includes a controller circuit 325. The controller circuit 325 is coupled to each of the power outputs 310, 315, and 320. Also, in association with the power outputs 310, 315, and 320, the controller circuit 325 is respectively coupled to the IHSs that are coupled to the power outputs 310, 315, or 320.

As depicted in FIG. 3, the power adapter 105 optionally includes network interfaces (e.g., interfaces for Ethernet, or wireless networks such as Blue-tooth or IEEE 802.11 networks) 330, 335, and 340. Each of the network interfaces 330, 335, and 340 is coupled to a network so that such network interface is an interface between an IHS and the network.

The AC/DC converter 305 of the power adapter 105 is capable of supplying power (e.g., DC) to the power outputs 310, 315, and 320 and ultimately to IHSs that are coupled to each the power outputs 310, 315, and 320. The AC/DC converter 305's aggregate capacity, and accordingly, the power adapter 105's aggregate capacity for supplying such power is indicated by the power adapter 105's power rating (e.g., indicated in volts). In response to one or more IHSs being coupled to and/or decoupled from its power outputs 310, 315, and 320, the power adapter 105 determines an amount of power to be supplied to each of the power outputs that is coupled to an IHS. For each of the power outputs 310, 315, and 320, such amount of power determined is a portion of the power adapter 105's aggregate power capacity. In response to determining such amount of power for each of the power outputs 310, 315, and 320, the power adapter 105 supplies such determined amount of power to the respective power output. In performing the functions discussed above, the power adapter 105 performs the processes discussed below in connection with FIGS. 4 and 5.

Figure 4:
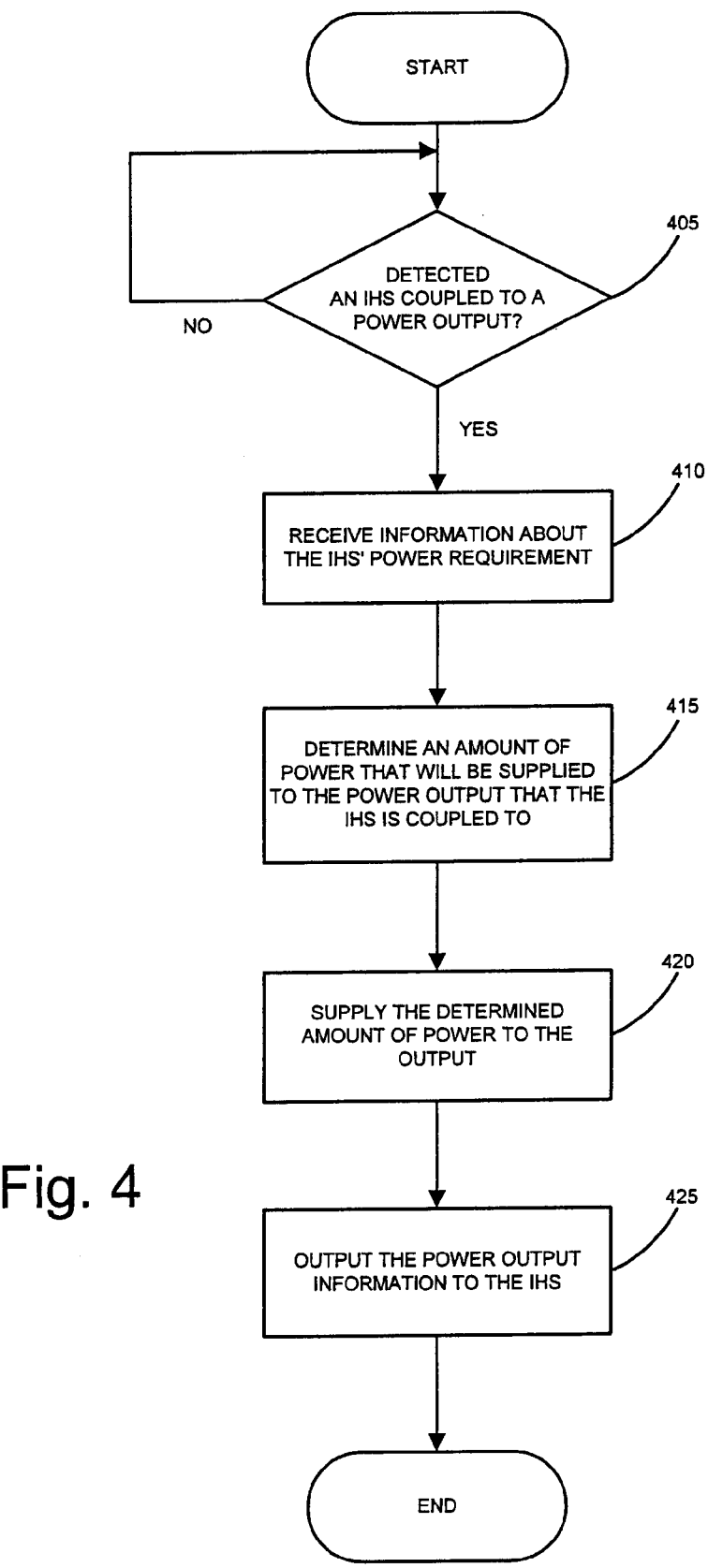
FIG. 4 is a flow chart of operations of a process executed by the power adapter of FIG. 1.

FIG. 4 is flow chart of operations of a process executed by the power adapter 105 of FIG. 1. The operation begins at a step 405, where the controller circuit 325 of the power adapter 105 self loops until it has detected an IHS being coupled to one of the power outputs 310, 315, and 320. In response to the controller circuit 325 detecting an IHS being coupled to one of the power outputs 310, 315, and 320, the operation continues to a step 410.

At the step 410, the controller circuit 325 receives information about the IHS' power requirement (e.g., as indicated by the IHS' power rating). Such information includes the IHS' non-preferred or less than preferred (e.g., minimum) power requirement and its preferred (e.g., optimum) power requirement. In one example, the controller circuit 325 receives such information by identifying the IHS' type (e.g., as indicated by the IHS' model number) and determining power requirement information that is associated with such IHS type. After the step 410, the operation continues to a step 415.

At the step 415, the controller circuit 325 determines an amount of power that will be supplied to the power output, to which the IHS detected at the step 405 is coupled. The controller circuit 325 determines such amount in response to aggregate capacity of the power adapter 105 and the amount of power that is currently supplied to the power adapter 105's other power outputs. In one example, If the controller circuit 325 determines that the power adapter 105 has sufficient available capacity to supply the amount of power (e.g., the minimum or the optimum amount of power as indicated by the information received at the step 410) required by the IHS, the controller circuit 325 determines that such amount will be supplied to the power output. However, if the controller circuit 325 determines that the power adapter 105 does not have sufficient available capacity to supply the required amount (e.g., at least the minimum amount) of power, the controller circuit 325 is nonetheless capable of adjusting amounts of power currently supplied to one or more of the other power outputs so that the power adapter 105 is able to supply power (e.g., the minimum amount of power or the optimum amount of power) to the power output. In one example, the controller circuit 325 increases the available capacity of the power adapter 105 by reducing an amount of power supplied to one of the other power outputs if such amount is greater than minimum power requirement of an IHS that is coupled to such power output.

In an alternative embodiment, in response to its determining that the power adapter 105 does not have sufficient available capacity to supply power to a power output, the power adapter 105 allows one or more of the power outputs to share the available capacity. In one example, the power adapter 105 allows such sharing by supplying one or more power outputs with power for a first period of predetermined amount of time, and after the predetermine amount of time, supplying power for a second period of predetermined amount time to other power outputs which did not receive power during the first time period. Also, the power adapter 105 repeats such operation. After the step 415, the operation continues to a step 420.

At the step 420, the power adapter 105 supplies power to the power output according to the amount of power determined at the step 415. After the step 420, the operation continues to a step 425.

At the step 425, the controller circuit 325 outputs power output information (e.g., information including the amount of power that the power adapter is supplying to the power output) to the IHS. In one example, the controller circuit 325 outputs such information to the IHS by outputting information indicating to the IHS that the IHS is receiving power from a conventional power adapter (e.g., a conventional power adapter that is designed to supply power to the IHS). After the step 425, the operation ends.

Figure 5:
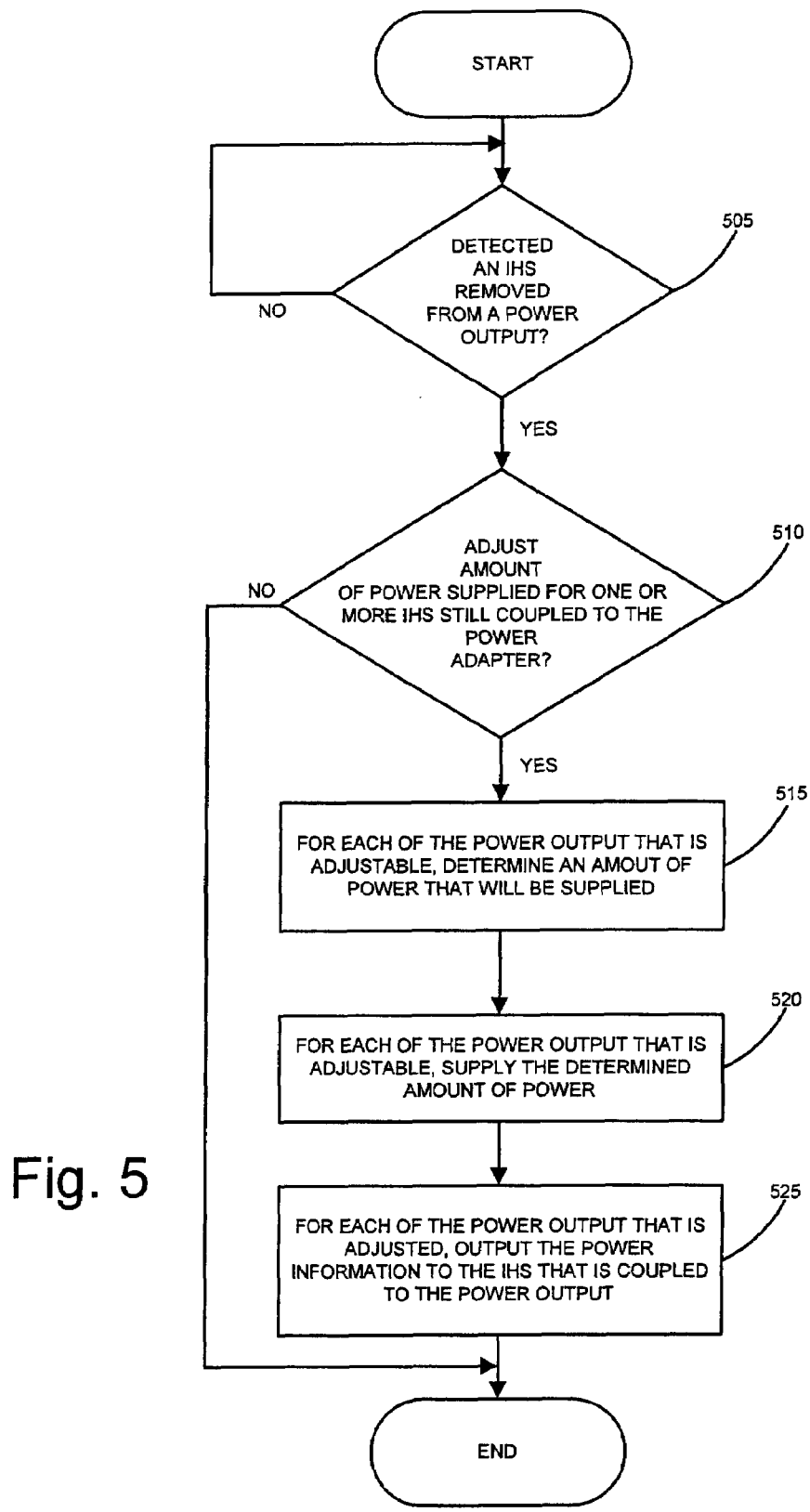
FIG. 5 is a flow chart of operations of another process executed by the power adapter of FIG. 1.

FIG. 5 is flow chart of operations of another process executed by the power adapter 105 of FIG. 1. The operation begins at a step 505, where the controller circuit 325 self loops until it has detected an IHS being decoupled from one of the power outputs 310, 315, 320. In response to detecting as such, the operation continues to a step 510.

At the step 510, the controller circuit 325 determines whether it is specified to modify (e.g., adjust) amounts of power supplied to one or more of the other power outputs, to which, IHSs are still coupled. In one example, the controller circuit 325 makes such determination if decoupling of the IHS has increased the power adapter 105's available capacity so that the power adapter 105 is now able to supply more power to one of the other power outputs coupled to an IHS that is capable of receiving more power (e.g., is currently receiving minimum amount of power it requires). In response to the controller circuit 325 determining that it is specified to modify amounts of power supplied to one or more of the other power outputs, the operation continues to a step 515. Otherwise, the operation ends.

At the step 515, the controller circuit 325, for each of the outputs that is adjustable, determines an amount of power that will be supplied. The controller circuit 325 makes such determination by distributing the now increased available capacity to one or more of the power outputs, still coupled to IHSs, that are capable of receiving more power. In one example, the controller circuit 325 supplies more power to a power output coupled to an IHS receiving its minimum power required so that the IHS now receives its optimum power required. After the step 515, the operation continues to a step 520.

At the step 520, the power adapter 105, for each of the outputs that is adjustable, supplies an adjusted amount of power that is determined at the step 515. After the step 520, the operation continues to a step 525.

At the step 525, for each of the power outputs that is receiving an adjusted amount of power, the controller circuit 325 outputs the power information to an IHS that is coupled to such power output. The controller circuit 325 performs such operation in a manner that is substantially similar to the operation discussed above in connection with the step 425 of FIG. 4.

In the illustrative embodiment discussed above in connection with FIGS. 4 and 5, the power adapter 105 determines an amount of power supplied to each of the power outputs in response to the power adapter 105's available power capacity and a power requirement of an IHS that is coupled to the power output. However, in an alternative embodiment, the power adapter 105 is capable of determining such amount of power without receiving the IHS' power requirement. In one version of such embodiment, the power adapter 105 determines the amount of power supplied to each of the power outputs in response to number of IHSs that are coupled to the power adapter 105. In one example, in response to three IHSs being coupled to the power adapter 105, the power adapter supplies 150 watts to each of the power outputs, and in response to four or more IHSs being coupled to the power adapter 105, the power adapter 105 supplies 90 watts to each of the power outputs.

Although illustrative embodiments have been shown and described, a wide range of modification, change and substitution is contemplated in the foregoing disclosure. Also, in some instances, some features of the embodiments may be employed without a corresponding use of other features. Accordingly, it is appropriate that the appended claims be construed broadly and in manner consistent with the scope of the embodiments disclosed herein.

What is claimed is:

1. A method performed by a power adapter having multiple power outputs, the method comprising:
   coupling a first information handling system (IHS) to a first power output of the multiple power outputs;
   coupling a second IHS to a second power output included by the multiple power outputs;
   coupling a controller to each IHS and each power output;
   determining power ratings for coupled IHSs by identifying types of the coupled IHSs;
   automatically detecting when an IHS is decoupled from one of the power outputs;
   in response to the first IHS being decoupled from the first power output, determining an amount of power that is supplied to the second power output, and
   automatically adjusting the amount of power that is supplied to the second power output.

2. The method of claim 1, wherein determining the amount of power is in response to number of IHSs that are coupled to the power adapter.

3. The method of claim 1, wherein determining the amount of power includes:
   receiving an IHS' power requirement; and
   determining whether the power adapter has sufficient available capacity to supply power according to the HIS' power requirement.

4. The method of claim 3, wherein determining the amount of power further includes:
   in response to determining that the power adapter does not have sufficient available capacity, determining whether the power adapter is capable of increasing the power adapter's available capacity.

5. The method of claim 4, wherein the power output is a first power output and determining whether the power adapter is capable of increasing the power adapter's available capacity includes:
   determining whether the power adapter is capable of reducing power supplied to a second power output of the multiple power outputs.

6. The method of claim 1, wherein the power adapter includes a network interface.

7. A power adapter comprising:
   multiple power outputs;
   a first information handling system (IHS) coupled to a first power output of the multiple power outputs;
   a second IHS coupled to a second power output included by the multiple power outputs; and
   a controller circuit for:
      determining power ratings for coupled IHSs by identifying types of the coupled IHSs, automatically detecting when an IHS is decoupled from one of the power outputs and in response to the first IHS being decoupled from the first power output, determining an amount of power that is supplied to the second power output, and
      automatically adjusting the amount of power that is supplied to the second power output.

8. The power adapter of claim 7, wherein determining the amount of power is in response to the number of IHSs that are coupled to the power adapter.

9. The power adapter of claim 7, wherein determining the amount of power includes:
   receiving an IHS' power requirement; and
   determining whether the power adapter has sufficient available capacity to supply power according to the HIS' power requirement.

10. The power adapter of claim 9, wherein determining the amount of power further includes:
    in response to determining that the power adapter does not have sufficient available capacity, determining whether the power adapter is capable of increasing the power adapter's available capacity.

11. The power adapter of claim 10, wherein the power output is a first power output and determining whether the power adapter is capable of increasing the power adapter's available capacity includes:
    determining whether the power adapter is capable of reducing power supplied to a second power output of the multiple power outputs.

12. The power adapter of claim 7, wherein the power adapter includes a network interface.

* * * * *

UNITED STATES PATENT AND TRADEMARK OFFICE
CERTIFICATE OF CORRECTION

| | | |
|---|---|---|
| PATENT NO. | : 7,550,871 B2 | Page 1 of 1 |
| APPLICATION NO. | : 11/750666 | |
| DATED | : June 23, 2009 | |
| INVENTOR(S) | : Price et al. | |

It is certified that error appears in the above-identified patent and that said Letters Patent is hereby corrected as shown below:

Claim 9; Column 6; Line 49 delete "HIS'" and insert --IHS'--.

Signed and Sealed this

Seventeenth Day of November, 2009

David J. Kappos
*Director of the United States Patent and Trademark Office*